Sept. 24, 1957 J. P. VASSEUR 2,807,783

PULSE CODE MODULATION SYSTEMS

Filed April 27, 1954 5 Sheets-Sheet 1

Sept. 24, 1957 J. P. VASSEUR 2,807,783

PULSE CODE MODULATION SYSTEMS

Filed April 27, 1954 5 Sheets-Sheet 2

Sept. 24, 1957 J. P. VASSEUR 2,807,783

PULSE CODE MODULATION SYSTEMS

Filed April 27, 1954 5 Sheets-Sheet 3

Sept. 24, 1957 J. P. VASSEUR 2,807,783

PULSE CODE MODULATION SYSTEMS

Filed April 27, 1954 5 Sheets-Sheet 4

Sept. 24, 1957 J. P. VASSEUR 2,807,783

PULSE CODE MODULATION SYSTEMS

Filed April 27, 1954

5 Sheets-Sheet 5

United States Patent Office 2,807,783

Patented Sept. 24, 1957

2,807,783

PULSE CODE MODULATION SYSTEMS

Jean Pierre Vasseur, Paris, France, assignor to Societe Française Radio-Electrique, a corporation of France Application April 27, 1954, Serial No. 425,957

Claims priority, application France April 28, 1953

13 Claims. (Cl. 332—11)

Transmitting systems are known in which the information is transmitted not in a continuous way but in the form of brief pulses succeeding each other in time. One parameter of these pulses is varied in accordance with the information to be transmitted. Such variation can be obtained for instance by amplitude, duration, position or frequency modulation of the transmitted pulses.

In the case of conventional pulse modulation, the modulated pulses are transmitted as such. However, in the case of coded modulation, these pulses are "quanticized," i. e. the value of the variable parameter of the pulses is expressed as a function of fixed, discrete levels, each pulse being replaced by the nearest level. Following that, a code group of signals corresponding to the level substituted for the quanticized pulse is transmitted. When this code group is received the modulated pulse is restored. The advantages of such transmission systems are well known.

The binary code is generally used for quanticizing the pulses modulated by the intelligence signal to be transmitted. This means that the numbers expressing the values of the various fixed levels are expressed in terms of binary code, which is particularly convenient, since this code utilises two figures only, namely 1 and 0, of which the former can be represented by a pulse and the latter by the absence of any pulse.

It will be seen therefore that pulse code modulation is closely bound with the problem of pulse counting.

It is conventional practice to perform pulse counting on a binary code basis. To this end, chains of bistable flip-flop stages, sometimes called bistable toggles, such as bistable multivibrators are used. As is well known, such multivibrators may comprise two twin triodes, one triode being on, i. e. conducting, in one stability state of the multivibrator, and off, i. e. not conducting in its other stability state, the reverse being true for the other triode. One of these states may be termed state "0" and the other state "1." Thus in any given state, each bistable device, such as a bistable multivibrator, of a chain of such devices may be considered as being representative of the digit of one of the columns of a number in the binary code, since these digits are either "0" or "1."

For instance, a chain of three bistable multivibrators being provided, if the first one is in the state "1," the second in the state "0" and the third in the state "1," the number 101 would be manifested, which as well known means 5 in the binary code.

Assuming now that the first multivibrator of a chain is initially in the state "0," an incoming pulse trips the multivibrator, i. e. extinguishes the conduction of that one of the twin triodes of this multivibrator which was conducting and causes conduction to occur in the other twin triode. Thus the multivibrator which was in the state "0," is set in the state "1," which corresponds to the digit "1" in the first column of a number coded in the binary code. A second incoming pulse resets the first multivibrator in the "0" state and sets the next multivibrator, which was previously in the state "0," in the state "1." Thus the number "2" is manifested in the binary code by the chain of toggles, since the first multivibrator, i. e. the first column in the binary code, shows "0," and the second multivibrator, i. e. the second column in the binary code, shows "1."

Systems of this type which are well known, have several drawbacks.

First, the number of tripped stages is not the same for each incoming pulse. This may be inconvenient in certain cases. Further a single miscarried stage tripping may result in considerable errors, since each digit of a given column is worth twice the digit in the preceding column. For instance, if a tripping is miscarried and, starting from 01111, provides 11111, instead of providing 10000, the counting jumps from 15 to 31.

To avoid this inconvenience, particular binary codes have been devised. In such codes each number is designated in such a way that it differs from the previous one by a single digit in a single column, which is not the case in the conventional binary system since in the latter "one," for instance, is designated, in a five digit system, by "00001" and "two" by "00010."

Such a system has been described in the U. S. Patent 2,660,618 to Pierre R. Aigrain.

According to this system following designations are provided for the numbers comprised, for instance, between 1 and 31:

| | |
|---|---|
| 0—00000 | 16—11000 |
| 1—00001 | 17—11001 |
| 2—00011 | 18—11011 |
| 3—00010 | 19—11010 |
| 4—00110 | 20—11110 |
| 5—00111 | 21—11111 |
| 6—00101 | 22—11101 |
| 7—00100 | 23—11100 |
| 8—01100 | 24—10100 |
| 9—01101 | 25—10101 |
| 10—01111 | 26—10111 |
| 11—01110 | 27—10110 |
| 12—01010 | 28—10010 |
| 13—01011 | 29—10011 |
| 14—01001 | 30—10001 |
| 15—01000 | 31—10000 |

Such a system may be termed a cyclic permutation or CP system. It may be seen that digits in the first column from the right change every two numbers beginning from 1, digits in the second column change every four numbers beginning from 2, digits in the $n$th column changing every $2^n$ number beginning from $2^{n-1}$.

To go over from the designation of a number in the CP code to the corresponding designation in the binary code, a digit of the number as designated in the binary code will be obtained by adding all the digits which, in the CP code designation, have the same rank as or a higher rank than this digit. If this sum is either an even number or zero, 0 will be entered in the binary designation; if it is odd, there will be entered 1.

In view of error possibilities involved in the conventional binary code counting, as has just been recalled, coding should preferably be effected in the CP code rather than in the ordinary binary code, or at least coding in the binary system should preferably be effected via the CP code.

It is therefore an object of the invention to provide a coder for quanticizing modulated pulses, and coding such pulses, in the CP system.

According to the invention, the signal to be coded is first sampled, after which samples of signal are converted in pulses position modulated in one direction only, following which the values of the delays respectively applied to these pulses are quanticized in the CP system.

The coder according to the invention performs electronically the sequence of arithmetical operations necessary to code in the CP system a number given in terms of the common decimal system. These operations are as follows:

Let $x$ be the number to be coded, this number being assumed to be smaller than $2^n$. The number $x$ is first compared with $2^{n-1}$. The difference $d_1=x-2^{n-1}$ is then considered: if this difference is negative, 0 is entered and if it is positive, 1 is entered. This yields the first digit from the left of the number $x$ as coded in the CP system.

Next, the absolute value of $d_1$ is compared with $2^{n-2}$. If the difference $d_2=|d_1|-2^{n-2}$, is negative, 1 is entered (not 0 as in the case of $d_1$); if $d_2$ is positive, 0 is entered. This yields the second digit from the left of the number $x$ as coded in the CP system.

The difference $d_3=|d_2|-2^{n-3}$, $d_4=|d_3|-2^{n-4}$ . . . $d_n=|d_{n-1}|-1$ are to be handled in the same way as $d_2$.

It should be noted that the above rule applies exactly only to numbers other than whole numbers, although it still applies exactly if the difference of the number considered with a whole number is infinitely small. If the process is applied to a whole number, one of the differences, $d_1$ to $d_n$ will be zero. Either 0 or 1 should then be entered in the corresponding column of the CP coded number. The error thus possibly made is but one unit and, as well known, this is a major advantage of the CP code, since if, when utilizing this code, 0 is substituted for 1, or vice versa, in a number, or code group, the value of the coded number will be altered by no more than one unit.

The invention will be best understood from the following description considered in conjunction with the attached drawing wherein.

Figure 1:
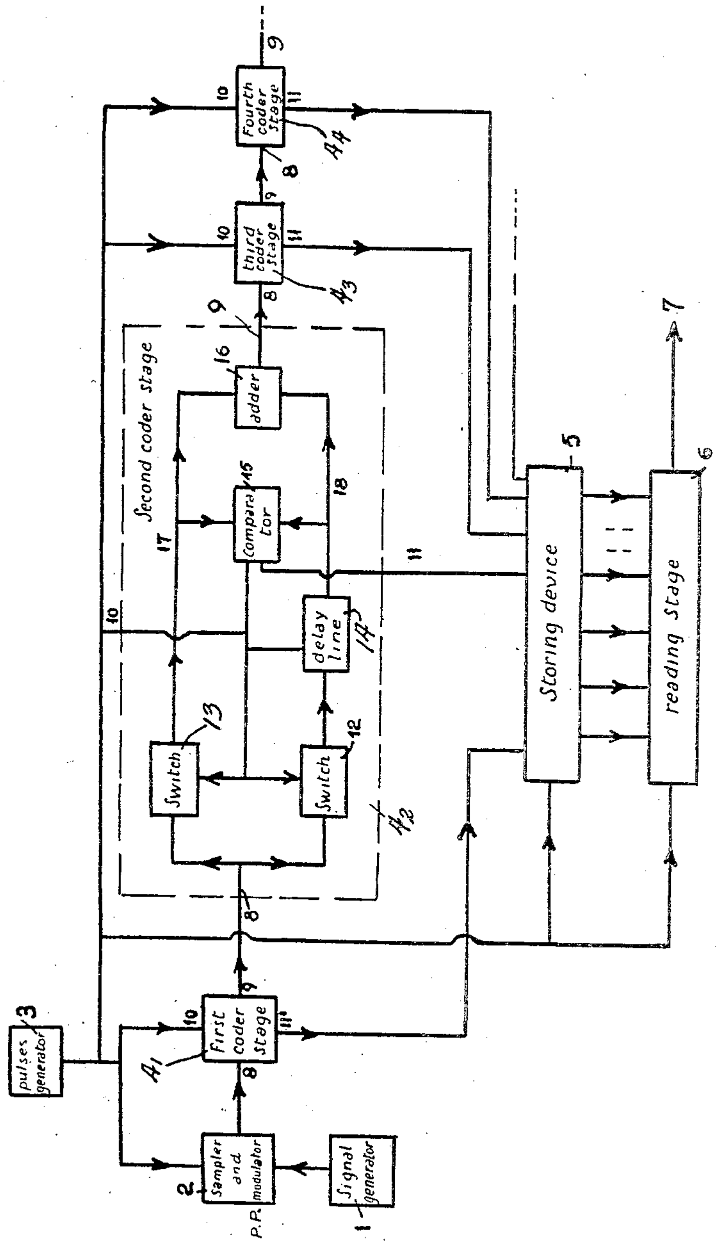
Fig. 1 is a block diagram of a specific embodiment of the coder according to the invention.

The general operation of the coding system, very diagrammatically shown in Fig. 1, is as follows:

A source 1 delivers a signal while a source 3 delivers pulses 40 (Fig. 3) at frequency equal to $$\frac{1}{T}$$

At 2, the signal is sampled and the samples of signal modulate in position the pulses provided by the source 3. The pulses 41 thus modulated (Fig. 3) are applied to the input 8 of the first coder stage $4_1$. Simultaneously, unmodulated pulses 40 are applied at the input 10. As will be seen from Fig. 3, modulation causes the modulated pulses 41 to be more or less delayed with respect to the pulses 40, two pulses 40 and 41 constituting a pair and the delay never exceeding T.

The stage $4_1$ is so arranged as to feed at 9 to the following stage $4_2$ both the pulse 41 and a pulse 42 (Fig. 3) which has a delay of $$\frac{T}{2}$$

relative to the pulse 40. The stage $4_2$ is so arranged as to feed to the stage $4_3$ a further pair of pulses consisting of that one of the pulses 41 or 42 which was the first to enter the stage $4_2$ and which, in said stage $4_2$, has been delayed by a time interval equal to half the delay caused by the stage $4_1$, i. e.

$$\frac{T}{2}:2=\frac{T}{4}$$

and of that one of the pulses 42 or 41 which has not been delayed in the stage $4_2$.

The various stages $4_3$ . . . $4_n$ behave like the stage $4_2$, bringing about the delays $$\frac{T}{8}\cdots\frac{T}{2^n}$$

in succession.

Figure 3:
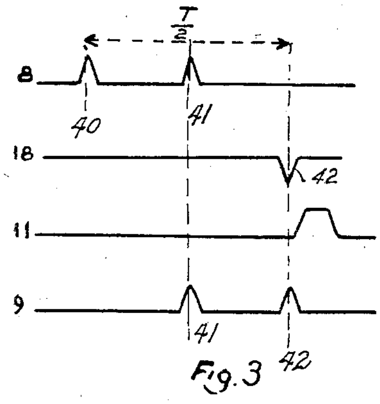

Furthermore, the stage $4_1$ delivers a pulse at its output 11' if the pulse 42 precedes the pulse 41 (Fig. 4), but not if 41 precedes 42 (Fig. 3). On the contrary, the stages $4_2$ . . . $4_n$ deliver no pulse if the pulse delayed by $$\frac{T}{2^k}$$

($k$ being the rank of the stage concerned) precedes the undelayed pulse, whereas they do deliver a pulse at the output 11 in the reverse case.

Under these conditions, it will be seen that the coder constitutes a computer effecting the above defined sequence of arithmetical operations necessary for CP-coding the number of levels corresponding to the modulation in the stage 2 by one sample of the signal provided by the source 1, of one pulse delivered by the source 3, this number of levels being always smaller than $2^n$, $2^n$ levels corresponding to T. The pulses appearing at the respective output leads 11 or 11' of the various coder stages represent various digits which, when put together, make up in the CP code the number corresponding to the level of the position modulated pulse applied at the input 8 of the first coder stage $4_1$. Exact coincidence of the two pulses of a pair corresponds to the above mentioned ambiguity which arises when the number to be coded is a whole number.

Since the pulses representing the various digits of the number to be coded in the CP system appear at the respective output ends 11' and 11 of the stages $4_1$ to $4_n$ at irregular time intervals, it is of advantage to store these pulses in storing devices 5, thus obtaining at 7 a train of regularly spaced pulses, by means of the delay lines 36 of a device 6, when the respective storing devices 5 are caused to deliver the stored pulses.

Pulses delivered by the source 3 are furthermore used for resetting the whole coder back to zero, or normal position, after each coded number has been manifested by the coder.

Figure 5:
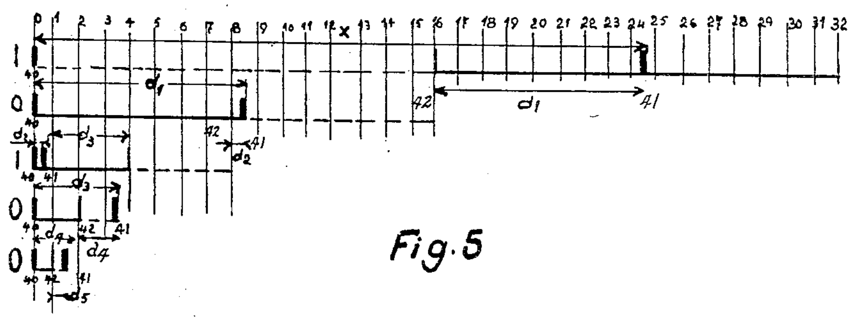
Figs. 3 to 5 are explanatory curves.

Figure 5 illustrates the operation of a coder, when coding a sample whose modulation level lies between 24 and 25, the level maximum being 32. The first stage provides the first digit of the code, i. e. 1, since the difference $d_1=x-16$ lies between 8 and 9, hence is positive.

The second stage gives 0, since $d_2=|d_1|-8$ is positive and included between 0 and 1.

The three stages following the second stage give respectively 1, 0 and 0. Thus, the number 10100 is obtained in the CP code.

Figure 1 is a general diagram of the stage $4_2$. Its input 8 is connected to an assembly 12—13 which switches the two pulses of the pair along two different paths. The first pulse is delayed by $$\frac{T}{4}$$

at 14, and the pulse thus delayed, together with the other pulse of the pair make up the output pair in an adder 16. An arrangement 15 indicates the order in which these pulses arrive, and is capable of delivering a pulse at 11.

A pulse applied at 10, supplied by a source 3, resets the whole assembly to the normal state at the end of each cycle.

Figure 2:
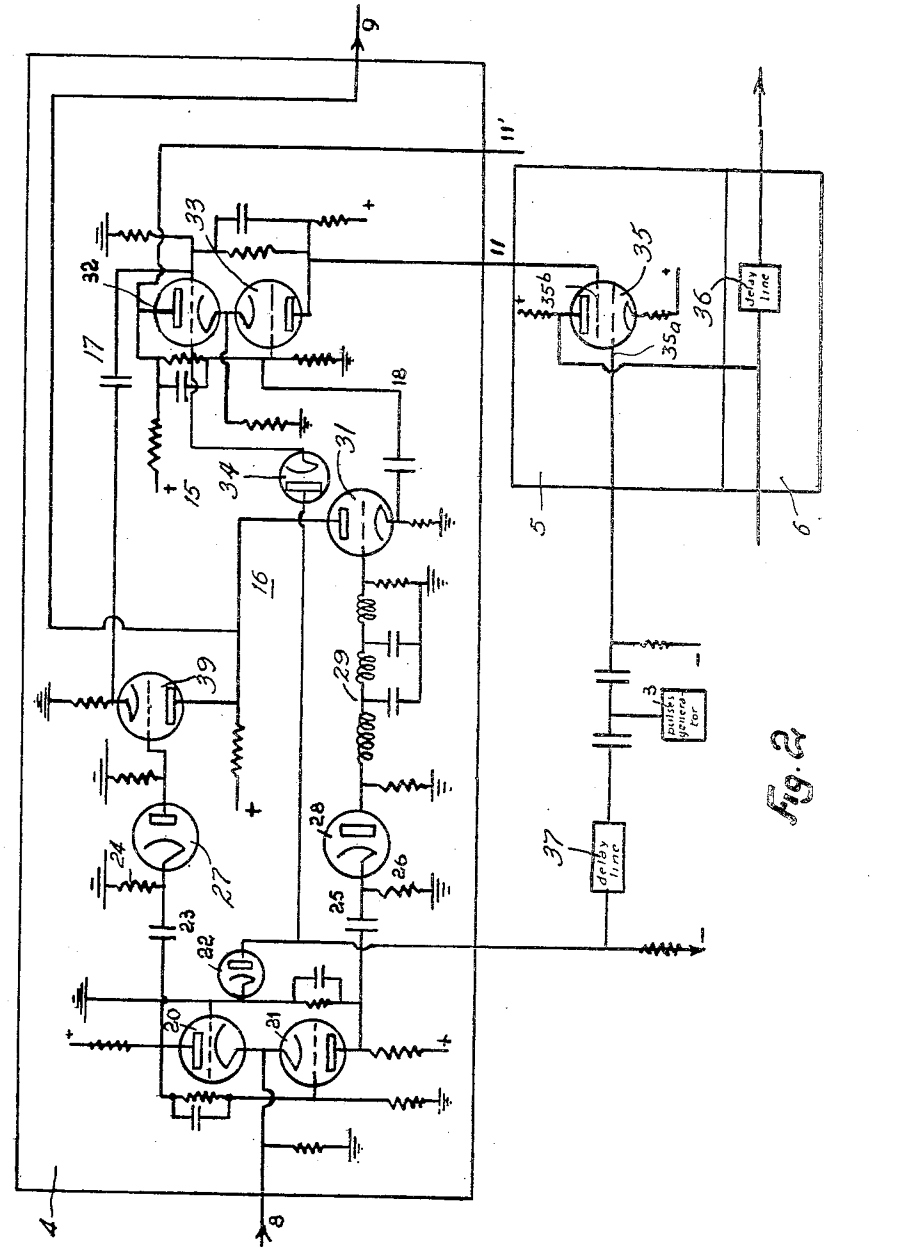
Fig. 2 is a more detailed diagram of one of the stages of the coder of Fig. 1.

There is shown in Figure 2, by way of example, a practical embodiment of a stage of the coder according to the invention. The incident pair of pulses 40 and 41, which for example will be assumed positive, is applied to the connected cathodes of two twin triodes 20 and 21, which are connected to form a bistable multivibrator or flip-flop assembly. A negatively biased diode 22, connected to the grid of the triode 20, enables this multivibrator, which corresponds to the assembly 12—13 of Fig. 1, to be reset to zero.

The two outputs of the multivibrator 20—21 are respectively connected to the grid of a triode 30, through a differentiating circuit, consisting of a capacity 23 and a resistance 24, and through a diode 27 and to the grid of a triode 31, through a differentiating circuit, consisting of a capacity 25 and a resistance 26, through a diode 28 and a delay line 29. The anodes of the triodes 30 and 31 are connected in shunt to the output lead of the stage. These two triodes make up an adder 16 (Fig. 1).

Two triodes 32 and 33 constitute a bistable multivibrator 15 (Fig. 1). Their grids are connected to the cathodes of triodes 30 and 31 respectively. In the stages other than the first, the code pulses are provided in the lead 11, connected to the anode of the triode 33, while in the first stage they are provided in the lead 11' connected to the anode of triode 32.

The output leads, 11 or 11' as the case may be, of each stage are connected to the grid 35$b$ of a tetrode 35 whose other grid 35$a$ is connected to the pulse generator 3. This generator feeds the grids 35$a$ of the various stages, in parallel. Further, the pulses from this generator, suitably delayed by a delay line 37, reset to zero the multivibrators in all the stages by acting on a suitable grid, through the diodes 22. On the other hand, the anodes of the tetrodes 35 of the successive stages are connected to the taps provided on a delay line 36, with a view to distributing uniformly in time the pulses provided by the various stages $4_1$ to $4_n$, which pulses, when combined together represent a digit in the CP code.

The coder described operates as follows:

In normal state, the triode 20 is conducting, while the triode 21 is not. The first pulse reaching the input 8, for example the positive pulse 40 (Fig. 3), trips the multivibrator made up by these two triodes, which results in a negative pulse 42 appearing both in the lead 18 and on the grid of the triode 31, whereas no signal is applied to the grid of triode 30. The second pulse reaching the input 8, for example the positive pulse 41, resets the multivibrator in its initial state. This gives rise to a negative pulse at the grid of triode 30, while a positive pulse is fed to the anode of this triode. No signal is applied this time to the grid of the triode 31.

Figure 4:
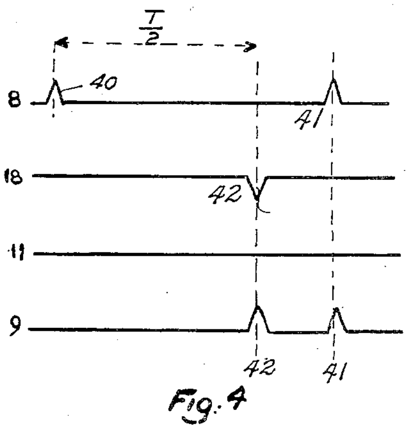

As explained above, the negative pulse 42, applied to the grid of the triode 31, is delayed by the delay line 29 with respect to the pulse 40. This negative pulse produces a positive pulse on the anode of the tube 31. Thus, at the output end 9 of a particular stage there is produced a pair of positive pulses 41, 42 which is transmitted to the following stage. Fig. 4 illustrates the case where the pulse 42 precedes the pulse 41.

Figure 7:
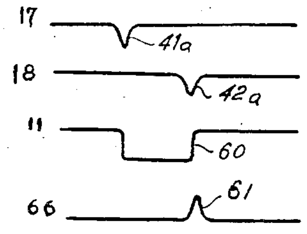
Figs. 7 and 8 are explanatory curves which relate to Fig. 6.

On the other hand the leads 17 and 18 (Fig. 7) feed the negative pulses 41$a$ and 42$a$ to the grids of the triodes 32 and 33 respectively. When the multivibrator 15 made up of these triodes is in the normal state, the triode 32 is conducting, with its anode being at a low potential, while the tube 33 is non conducting, its anode being accordingly brought to high potential. Assuming that the first pulse of the pair comes from the triode 30 and the second from the triode 31, the triode 33 will first be made conducting, then non-conducting again and its plate will be brought again to a high potential. This potential is transmitted to the grid 35$b$ of the tetrode 35. Under these conditions, when the generator 3 feeds a pulse to the grid 35$a$, the tube 35 will be made conducting and a pulse representing the digit 1 will be transmitted to the delay line 36. On the contrary, assuming that the first pulse of the pair comes from the triode 31 and the second from the triode 30, no change will be brought about by the first pulse, while the second pulse will trip the multivibrator 15. The triode 33 will become conducting and the grid 35$b$ will be brought to low potential, so that the tetrode 35 remains in the non-conducting state, even though a pulse is applied to the grid 35$a$ by the generator 3; the stage concerned will deliver no pulse, which corresponds to a 0 in the CP code.

In the first stage, the grid 35$b$ of the tetrode 35 is connected to the plate of the triode 32, and the conditions under which the digits "1" or "0" are produced are the reverse of those under which these digits are produced in the other stages.

The pulses, simultaneously delivered by the various stages, when the tubes 35 become conducting, propagate along the delay line 36 and appear at one of the extremities of the line at regular time intervals.

Figure 6:
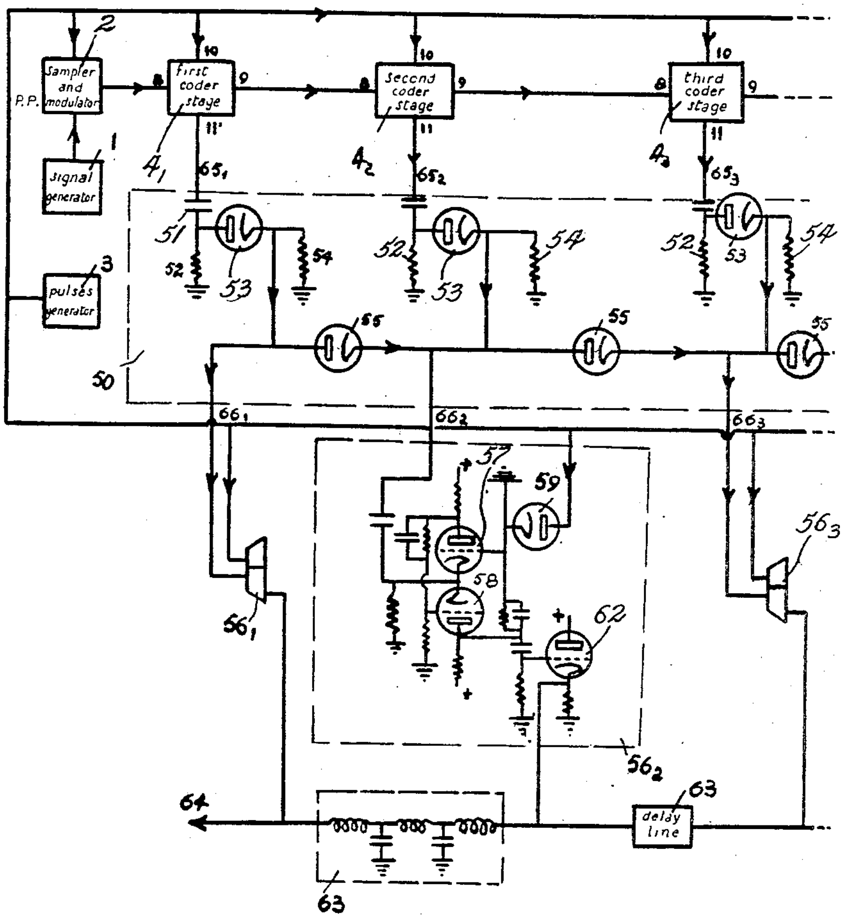
Fig. 6 shows very diagrammatically a coder according to the invention, equipped with a device for converting CP coding into conventional binary coding.

Fig. 6 shows a coder according to the invention, equipped with a device which makes it possible to change from the CP code to the conventional binary code so that in the end, coding is effected in terms of the latter code.

To this end, the above described arithmetical operations are electronically effected.

According to this embodiment of the invention, a device 50 is disposed at the output end of the coder, comprising $n$ inputs $65_1$, $65_2$ . . . $65n$ and $n$ outputs $66_1$, $66_2$ . . . $66_n$, the device being so arranged that a pulse applied at an input $65_q$ causes pulses to be delivered at the outputs $66_q$, $66_{q+1}$ . . . $66_n$, no pulse being delivered at the outputs $66_1$, $66_2$ . . . $66_{q-1}$.

The outputs $66_1$ to $66_r$ are connected to the respective control electrodes of the bistable multivibrators 56. The state of these multivibrators at the end of the coding process manifests the number previously coded in CP code and now coded in the conventional binary code.

It may be easily seen that, while the various stages $4_1$ to $4_n$ of the coder are delivering the various digits which, considered together, make up, in the CP system, the number to be coded, the first pulse, i. e. the pulse of the highest rank provided by the stage $4_1$, trips all the multivibrators $56_1$ through $56_n$, the second pulse provided by the stage $4_2$ trips them from the second onward, etc.

Assuming that these multivibrators were initially in the zero position, each of them will be at the end of the coding of a given sample in the "0" or in the "1" state, according to whether the sum of the digits, of the CP coded number of a rank higher than or equal to the rank of the corresponding digit in the binary code is an even or an odd number. This is but a confirmation of the CP code to binary code transform rule which was given at the beginning.

To read the binary-coded number delivered at the outputs of the multivibrators $56_1$ to $56_n$, the counter may for example be set back to zero, thereby causing those stages which are in the "1" state to deliver a pulse. Coded pulses are thus obtained at 64, at the end of a delay line 63, the function of which is to space them regularly in time.

Figure 6 shows, by way of example some embodiments of the devices 50 and 56.

A zero reset diode 34, connected between the pulse source 3 and the multivibrator 32—33, is additionally provided in the various stages, as indicated in Figure 2. In all stages other than the first one, this diode is connected to the grid of the triode 32, whereas in the first stage it is connected to the grid of the triode 33.

The inputs $65_1$ through $65_n$ to the unit 50 are connected to the inputs 11 to the various stages $4_1$ to $4_n$ respectively. Connected to each input is a differentiating circuit consisting of a capacity 51 and a resistor 52, the capacity-resistor junction being connected to the plate of a diode 53, the cathode of which is both earthed through a resistor 54 and connected to the outputs $66_1$ to $66_n$ respectively, of the device 50. Interposed between each pair of neighbouring outputs are diodes 55 which are poled as the diodes 53.

The multivibrators 56 consist of two triodes 57 and 58 and input signals are applied to the cathodes. The assembly is reset to zero by acting on the grids of the triodes 57 through diodes 59. The outputs are connected to the plates of the triodes 58 through a differentiating circuit and a cathode follower tube 62. The cathodes of the tubes 62 in all the stages are connected to taps provided on a delay line, made up of elements 63, and the various pulses representing the coding in the binary system, being thus regularly spaced in time, are collected at one extremity of the delay line.

Figure 8:
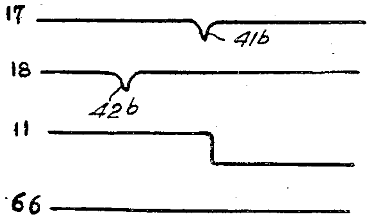

Operations of this arrangement (Figs. 7 and 8) shall now be explained with reference to a stage other than the stage $4_1$. The latter operates in the same manner.

At the beginning of the coding process the triode 32 is conducting and the lead 11 is at a high potential. If the pulse transmitted by the lead 17, i. e. the pulse **41*a* (Fig. 7), reaches the grid of tube 32 before the pulse 42*a* reaches the grid of tube 33, the multivibrator 32—33 will be tripped twice and the second tripping will produce a negative pulse 60 at the output 11 and a positive pulse 61 both at the cathode of the corresponding diode 53** and at the output $66_p$. This pulse will trip the corresponding multivibrator $56_p$, as well as the multivibrators of all upward stages, i. e. those having a rank higher than *p*. These conditions involve the transmission of the digit 1.

On the contrary (Fig. 8), if the pulse **41*b* (lead 17) reaches the grid of tube 32 after the pulse 42*b* has reached that of tube 33 (lead 18), the multivibrator 32—33 will be tripped only once and the pulse produced by the differentiating circuit 51—52 will be stopped by the diode 53**. The remaining elements will remain in normal state, which corresponds to zero.

When resetting to normal the multivibrators 56, some of them will already be in that state, while others will be in position "1." As far as the latter are concerned, the plate of the triode 58, which was previously at a low potential, will be brought to a high potential, which will bring about positive pulses at the grids of the triode 62. These pulses will propagate along the delay line 63, reaching the output 64 in succession.

While in the embodiment shown the device 50 comprises diodes, many other systems can of course be used. Triodes connected as cathode followers can be used for example, the grid of each triode being connected to the cathode of the preceding one.

Figure 9:
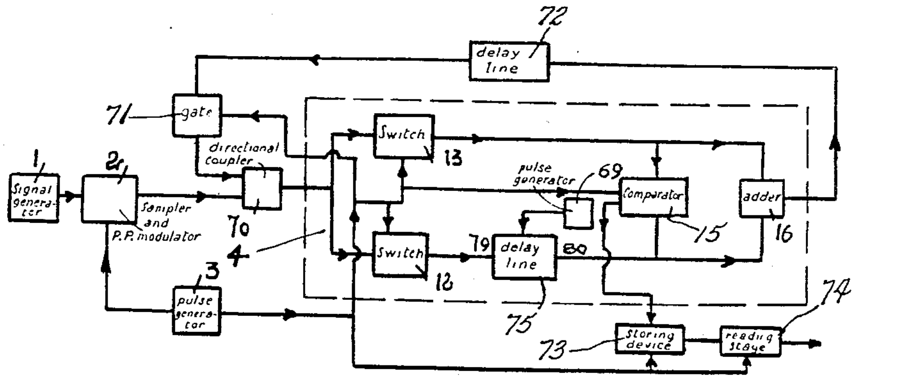
Fig. 9 is a block diagram of another embodiment of the coder according to the invention.

Fig. 9 shows an alternative embodiment of the coder of Fig. 1. In both figures, like elements have like reference numbers.

According to this embodiment, the position modulated pulses, instead of passing through the stages $4_1$ to $4_n$ in series, pass through one stage 4 only. At the output end of the adder 16 (tubes 30 and 31) the pair of pulses returns to the input of the stage 4, through a delay line 72, a gate 71 which is normally open, and a directional coupler 70 to which is also fed the initial pulse pair. This process, which hereinafter will be termed "recycling," is repeated *n* times if a code group of *n* digits is to be provided. The delay line 75, which corresponds to the delay line 14 of Fig. 1, is associated with control means, in turn controlled by a pulse generator 69, which halve the delay provided by the delay line, prior to the passage of each pair of pulses following the first, and restore the delay to its initial level after *n* recyclings. The purpose of the delay line 72 is to permit operation of the coding device prior to recycling.

Under these conditions, the pulses appearing successively at the output end of the priority detector 15 will obviously represent in CP code the signals fed to the input. These signals will be stored in a storing device 73 as in the case of Fig. 2.

At the end of each cycle, the gate 71 is closed and a further fresh pair of pulses is transmitted to the directional coupler 70.

The latter may consist of two triodes having their respective plates parallel connected and their input fed to the grids. The gate 71 will consist for instance of a pentode which will be blocked by acting on its screen grid. The storage and reading device will consist for instance of an electronic switch alternately feeding pulses to a series of multivibrators, whose state at the end of coding will be representative of the result of the coding. Reading will be done by resetting the multivibrators to zero and feeding the corresponding pulses to a delay line 74, as already explained above.

Figure 10:
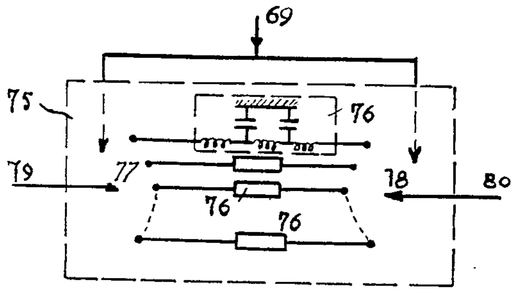

Figure 10 shows a possible embodiment of the variable delay line 75. A number of delay lines 76, whose respective delay ratios are $$\frac{T}{2}, \frac{T}{4} \cdots \frac{T}{2^n}$$

are provided and they are sequentially switched by means of electronic switches 77 and 78 of known construction.

Figure 11:
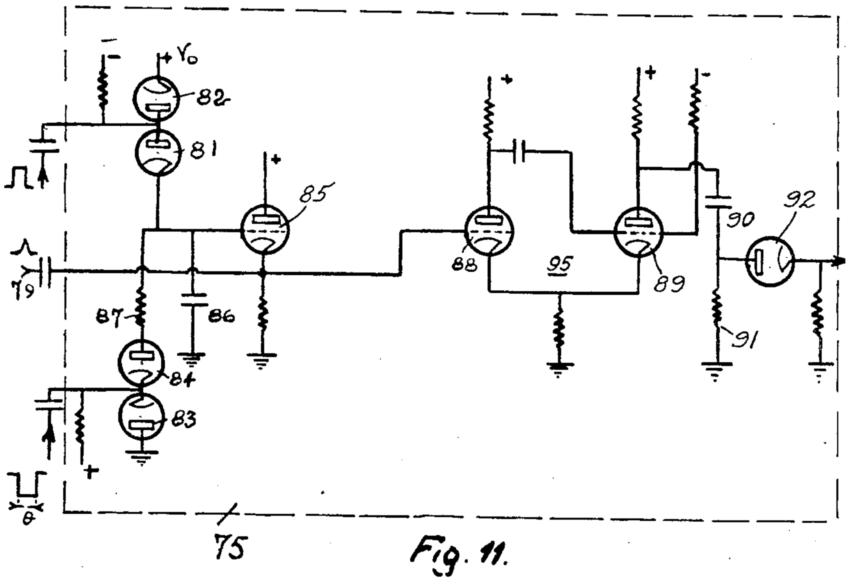
Figs. 10 and 11 show two alternative embodiments of the delaying element of the coder of Fig. 9.

Figure 11 shows another embodiment of the variable delay line 75. This line includes a monostable multivibrator 95, made up of two triodes 88 and 89. The anode of the triode 89 feeds a diode 92, through a differentiating circuit 90—91. The grid of the triode 88 is connected both to the input 79 of the delay line and to the cathode of a triode 85. The grid of this triode is earthed through a condenser 86 and a resistor 87. The end of the resistor connected to the grid is also connected to a fixed voltage ($V_0$) source, through a gate including diodes 81 and 82, while the other end of the resistor is earthed through another gate, formed by diodes 83 and 84. These two gates are normally closed.

This device operates as follows:

When a pulse is applied to the input 79, the multivibrator 95 is tripped, then is reset to normal after a period of time and delivers a pulse. The time interval *t* is substantially a linear function of the grid potential of the triode 88. Now, this potential is a function of the grid potential of triode 85. Thus, the problem boils down to halving this potential at each recycling. To this end, a negative pulse of a duration $\theta$ is applied between the successive recyclings to the connected cathodes of the diodes 83 and 84, these pulses being for instance controlled by the generator 3. The diodes 83 and 84 are thus caused to conduct and conditions are then the same as if the extremity of the resistor 87 were grounded. If $\theta$ is suitably selected, the condenser 86 looses half its load at each earthing and the grid potential of the triode 88 is accordingly halved.

Following *n* recyclings, the gate made up of the diodes 81 and 82 will be opened by applying a positive pulse to the connected cathodes of these diodes, the condenser 86 is then loaded to the potential $V_0$ and the device is ready to start a further sequence of recycling operations.

What I claim is:

1. In a pulse code modulation system comprising a source of a modulating signal, a sampler of said signal, and a source of unmodulated pulses having a frequency $$\frac{1}{T}$$

means for position modulating said pulses by delaying said pulses with respect to their unmodulated position by time intervals varying between zero and T at most, as a function of amplitude of said signal samples, T representing $k^n$ discrete modulation levels, where *k* is the base of said code and $n$ is an integer; means of the type capable, on reception of a pair of pulses, of delaying by $$\frac{T}{k^m}$$

that one of the pulses of said pair of pulses which precedes the other and of sequentially repeating this operation $n$ times $m$ being an integer comprised between 1 and $n$; means for sequentially feeding to said capable means pairs of pulses, each pair comprising one unmodulated pulse and the corresponding modulation delayed pulse; and means for ascertaining after each delaying operation whether the delayed pulse precedes or follows the non-delayed pulse.

2. A system according to claim 1 wherein $k$ is equal to 2.

3. A pulse code modulation system comprising: a source of modulating signal, a sampler of said signal; a source of unmodulated pulses having a frequency $$\frac{1}{T}$$

means for position modulating said pulses by delaying said pulses with respect to their unmodulated position by time intervals varying between zero and T at most, as a function of amplitude of said signal samples, T representing $k^n$ discrete modulation levels, where $k$ is the base of said code and $n$ is an integer; means of the type responsive to a pair of pulses for providing another pulse, delayed by $$\frac{T}{k^m}$$

with respect to that one of the pulses of said pair of pulses which precedes the other, and for sequentially repeating this operation $n$ times on pairs of pulses respectively comprising the last delayed pulse and that pulse of the preceding pair which has not been delayed $m$ being an integer comprises between 1 and $n$; means for feeding to said responsive means pairs of pulses, each pair comprising one unmodulated pulse and the corresponding modulation delayed pulse; and means for ascertaining after each delaying operation which one of the pulses precedes the other.

4. A system according to claim 3 wherein $k$ is equal to 2.

5. In a pulse code modulation system of the type comprising a source of a modulating signal a sampler of said signal, and a source of unmodulated pulses having a frequency $$\frac{1}{T}$$

means for position modulating said pulses by delaying said pulses with respect to their unmodulated position by time intervals varying between zero and T at most as a function of amplitude of said signal samples, T representating $k^n$ discrete modulation levels, where $k$ is the base of said code and $n$ is an integer; a coding stage; means for feeding to said coding stage pairs of pulses, each pair comprising one unmodulated pulse and the corresponding modulation delayed pulse; said coding stage including a first and a second channel; switching means of the type capable of receiving pairs of pulses, comprising each a first and a second pulse and switching to said first channel that one of said pair of pulses which precedes the other; in said first channel, delaying means for providing a third pulse, delayed by $$\frac{T}{k^m}$$

with respect to said first pulse, $m$ being an integer comprised between 1 and $n$; adding means connected to both said channels for feeding said second and third pulses to a following stage; and means connected to said first and second channels for ascertaining which one of said second and third pulses precede the other in time.

6. A pulse code modulation system comprising: a source of a modulating signal; a sampler of said signal; a source of unmodulated pulses having a frequency $$\frac{1}{T}$$

means for position modulating said pulses by delaying said pulses with respect to their unmodulated position by time intervals varying between zero and T at most as a function of amplitude of said signal samples, T representing $k^n$ discrete modulation levels where $k$ is the base of said code, and $n$ is an integer, $n$ coding stages, each comprising: a first and a second channel; input switching means, coupled to said channels, of the type capable, when fed with pairs of pulses comprising a first pulse followed in time by a second pulse, of feeding said first pulse to said first channel and said second pulse to said second channel; in said first channel delaying means for providing a third pulse, respectively delayed by $$\frac{T}{k^m}$$

with respect to said first pulse, $m$ being the rank of the coding stage, adding means connected to both said channels for feeding the said second and third pulses to the following stage; priority ascertaining means, connected to said first and second channels, of the type capable of ascertaining which one of said second and third pulses precede the other in time; means for feeding to said input means of the first stage said modulated and unmodulated pulses by pairs, each pair comprising a first unmodulated pulse and a second pulse which is the corresponding position modulation delayed pulse; means in said first coding stage for emitting a priority indicating signal when said third pulse precedes in time said second pulses; and means in each of said other coding stages for emitting the same priority indicating signal when said second pulse precedes said third pulse.

7. A system according to claim 6 wherein all said stages are constituted by a single assembly said assembly including said delaying means proper to each stage.

8. A system according to claim 6 wherein said $n$ stages are discrete cascade connected stages.

9. A system according to claim 6 wherein: said input means comprise a bistable multivibrator comprising one input for receiving incoming pulses, and two outputs one of which is conducting when the other is not; said first channel is connected to that one of said outputs which is normally non-conductive and comprises in series a differentiating circuit, a rectifier and said delaying means; said second channel is connected to the other of said multivibrator outputs which is normally conducting, and comprises in series a differentiating circuit, and a rectifier; said adding means comprise a pulse adder of the type having two inputs and three outputs said two inputs being respectively series connected to said two channels, one output of said adder being connected to the next stage; said priority ascertaining means comprise a second bistable multivibrator having a first and a second output, said first output being normally conducting when the other is not, and vice versa and a first and a second control inputs respectively connected to said two other adder outputs.

10. A system as claimed in claim 6 further comprising means for storing said signals provided by said stages until the last stage has provided said signal; means for causing said storing means, at the end of each period T, to deliver the stored signal; and delaying means connected to the said storing means for uniformly spacing in time said signals.

11. A system according to claim 6 further comprising $n$ bistable multivibrators having each a control input, means for feeding to each of said multivibrator control inputs said signal provided by that one of said stages which has the same rank as said multivibrator and other means for feeding to each of said multivibrator control inputs said signals provided by all the stages of a lower rank than said multivibrator.

12. A pulse code modulation system comprising: a source of a modulating signal; a sampler of said signal; a source of unmodulated pulses having a frequency $$\frac{1}{T}$$

means for position modulating said pulses by delaying said pulses with respect to their unmodulated position by time intervals varying between zero and T at most as a function of amplitude of said signal samples, T representing $k^n$ discrete modulation levels, where $k$ is the base of said code; and $n$ is an integer; a first and a second channel; input switching means, coupled to said channels of the type capable, when fed with pairs of pulses comprising a first pulse followed in time by a second pulse, of feeding said first pulses to said first channel and said second pulses to said second channel; means for feeding to said input means said modulated and unmodulated pulses by pairs, each pair comprising a first unmodulated pulse and a second pulse which is the corresponding position modulation delayed pulse; means in said first channel for providing a third pulse delayed with respect to said first pulse; priority ascertaining means connected to said first and second channels for ascertaining which one of said second and third pulses precedes the other in time; adding means for recycling said second and third pulses back to said input means; gating means connected between said adding and said input means for stopping said recycling after the same has taken place a predetermined number of times and means for controlling the delay by which said third pulse is delayed with respect to said first pulse at each recycling operation.

13. In a system according to claim 11 said delaying means comprising an input; a monostable multivibrator having a control electrode connected to said input; means for feeding a biassing potential of a predetermined value said control electrode; means for controlling said potential for sequentially reducing the same by a half; and means for reestablishing said biassing potential to said predetermined value after this reducing operation has taken place $n$ times.

References Cited in the file of this patent

UNITED STATES PATENTS

| | | |
|---|---|---|
| 2,485,821 | Gloess et al. | Oct. 25, 1949 |
| 2,569,927 | Gloess et al. | Oct. 2, 1951 |
| 2,651,716 | Feissel | Sept. 8, 1953 |